(12) United States Patent
Kawanishi

(10) Patent No.: US 12,063,437 B2
(45) Date of Patent: Aug. 13, 2024

(54) CONTROL APPARATUS, IMAGE CAPTURING APPARATUS, CONTROL METHOD, AND MEMORY MEDIUM

(71) Applicant: CANON KABUSHIKI KAISHA, Tokyo (JP)

(72) Inventor: Atsuya Kawanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/727,547

(22) Filed: Apr. 22, 2022

(65) Prior Publication Data

US 2022/0353427 A1 Nov. 3, 2022

(30) Foreign Application Priority Data

Apr. 28, 2021 (JP) ................................. 2021-075889

(51) Int. Cl.
*H04N 23/67* (2023.01)
*H04N 23/61* (2023.01)
*H04N 23/63* (2023.01)

(52) U.S. Cl.
CPC ........... *H04N 23/675* (2023.01); *H04N 23/61* (2023.01); *H04N 23/635* (2023.01)

(58) Field of Classification Search
CPC .... H04N 23/675; H04N 23/61; H04N 23/635; H04N 23/60; H04N 23/611; H04N 23/672
See application file for complete search history.

(56) References Cited

U.S. PATENT DOCUMENTS

2019/0278052 A1* 9/2019 Kikuchi ................... G02B 7/09

FOREIGN PATENT DOCUMENTS

| JP | 6145822 B2 | 6/2017 |
| JP | 2019-121860 A | 7/2019 |

* cited by examiner

*Primary Examiner* — Yogesh K Aggarwal
(74) *Attorney, Agent, or Firm* — Canon U.S.A., Inc., IP Division

(57) ABSTRACT

A control apparatus includes at least one processor and at least one memory storing instructions that, when executed by the at least one processor, cause the at least one processor to function as a setting unit and a selection unit. The setting unit is configured to set an object area indicating an object by using object information that includes information on a part of the object and is based on an image signal converted from an object image and to set a plurality of focus detection points by using the object area. The selection unit is configured to select, from the plurality of focus detection points in a selection area, a main focus detection point on which focusing is performed. In a case where the object is a vehicle, the selection unit makes the selection area narrower than the object area.

11 Claims, 19 Drawing Sheets

IN A CASE WHERE ONE PRINCIPAL PORTION
(FACE) IS DETECTED

IN A CASE WHERE PLURALITY OF PRINCIPAL
PORTIONS ARE DETECTED

CONTROL APPARATUS, IMAGE CAPTURING APPARATUS, CONTROL METHOD, AND MEMORY MEDIUM

BACKGROUND

Technical Field

The present disclosure relates to a control apparatus, an image capturing apparatus, a control method for image analysis using focus detection points, and a memory medium.

Description of the Related Art

In recent years, a technique has been proposed that identifies and focuses on an area of a main object in various autofocus (AF) methods such as an image capturing plane phase difference AF method and a contrast AF method. Japanese Patent Laid-Open No. ("JP") 2019-121860 discloses a method of setting a focus detection area based on reliability of detected results of parts of a face. Japanese Patent No. 6145822 discloses a method of changing a speed of a focusing operation based on a moving speed of a detected object in a direction in a captured image plane, so as to support focusing on a moving object.

However, in the method of JP 2019-121860, the focus detection area is set for the main object, and therefore the focus detection may not be performed in an area suitable for the focus detection. Particularly, a problem may occur that, in a case where an object, such as a vehicle including a two- and four-wheeled vehicles, moves quickly and is likely to be close to another object such as ground, an unintended object (for example, the ground) is focused on.

In the method of Japanese Patent No. 6145822, no particular countermeasure is taken for selection of a main focus detection point, and therefore the above problem occurs in a case where the object is a moving object or body such as a vehicle.

SUMMARY

The present disclosure provides a control apparatus, an image capturing apparatus, a control method, and a memory medium each of which can realize optimum focusing on a moving body or a moving object such as a vehicle.

A control apparatus according to one aspect of embodiments of the disclosure includes at least one processor and at least one memory coupled to the at least one processor storing instructions that, when executed by the at least one processor, cause the at least one processor to function as a setting unit and a selection unit. The setting unit is configured to set an object area including an object by using object information that includes information on a part of the object and is based on an image signal converted from an object image and to set a plurality of focus detection points by using the object area. The selection unit is configured to select, from the plurality of focus detection points in a selection area, a main focus detection point on which focusing is performed. In a case where the object is a vehicle, the selection unit makes the selection area narrower than the object area.

An image capturing apparatus including the above control apparatus, a control method corresponding to the above control apparatus, and a memory medium storing a computer program that enables a computer to execute the control method also constitute other aspects of the embodiments.

Further features of the disclosure will become apparent from the following description of exemplary embodiments with reference to the attached drawings.

DESCRIPTION OF THE EMBODIMENTS

Figure 1A:
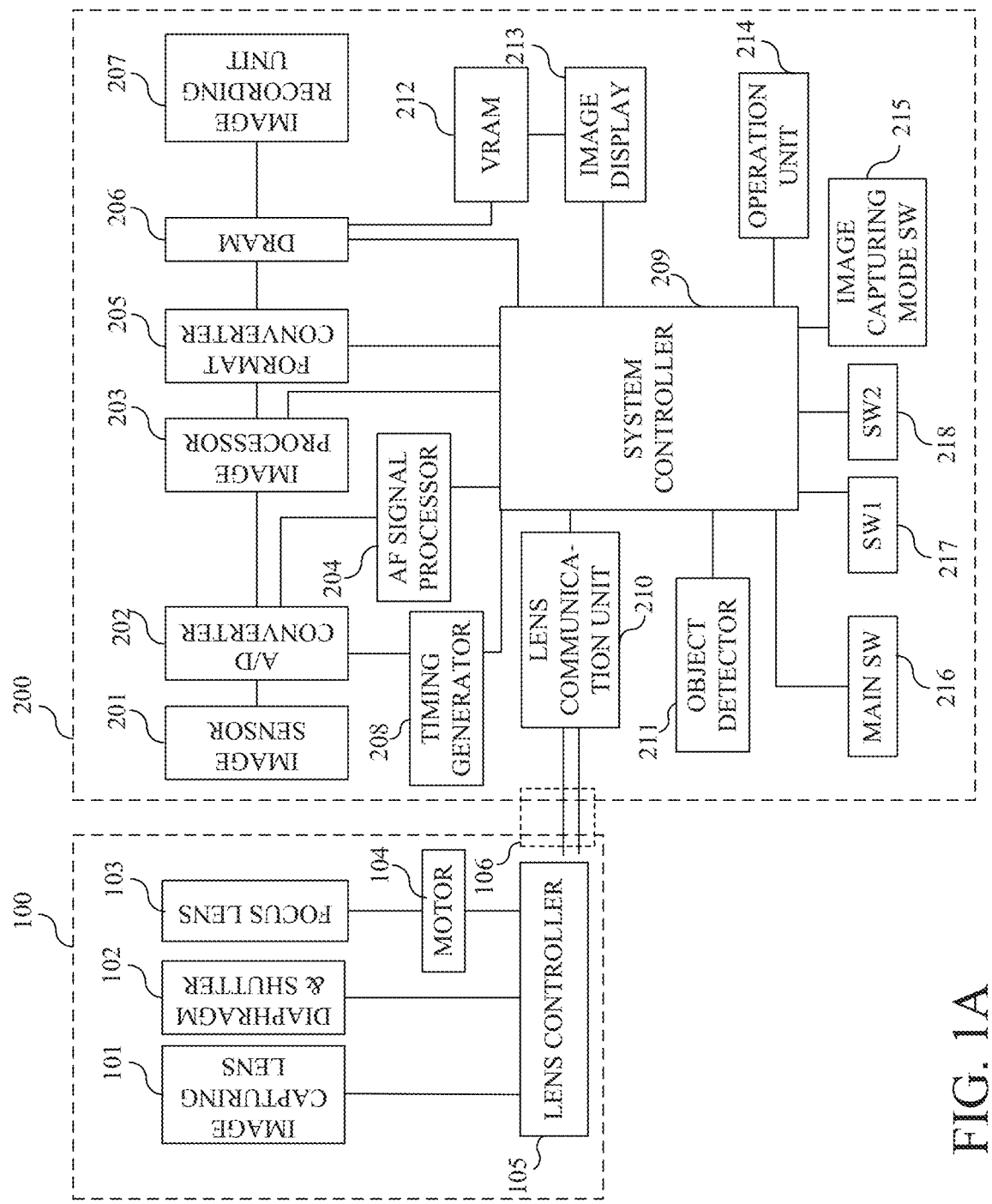
FIGS. 1A and 1B are block diagrams each illustrating a configuration of a camera system according to a first embodiment.

Referring now to the accompanying drawings, a detailed description will be given of embodiments of the present disclosure. Corresponding elements in respective figures will be designated by the same reference numerals, and a duplicate description will be omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" refers to any combination of the software and hardware contexts as described above.

First Embodiment

Figure 1B:
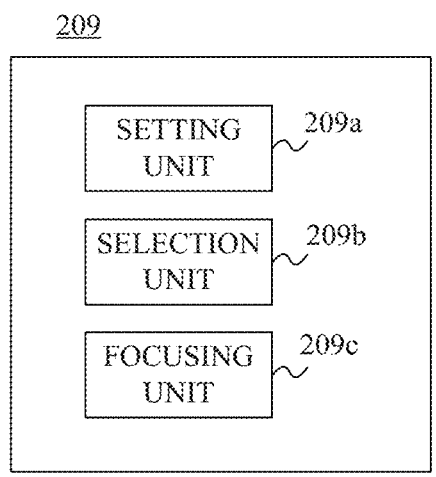

FIGS. 1A and 1B are block diagrams each illustrating a configuration of a camera system according to this embodiment. The camera system includes a lens apparatus (interchangeable lens) 100 and a camera body (image capturing apparatus) 200. The lens apparatus 100 is detachably attached to (interchangeably attached to) the camera body 200 via a mount (not illustrated), the mount including an electrical contact unit or circuit 106.

The lens apparatus 100 includes an optical system, a motor 104, and a lens controller 105. The optical system includes an image capturing lens 101, a diaphragm and shutter 102, and a focus lens 103. The image capturing lens 101 includes a zoom mechanism. The diaphragm and shutter 102 control a light amount. The focus lens 103 adjusts focus onto a light-receiving surface of an image sensor 201 by moving in an optical axis direction of the optical system. The motor 104 drives the focus lens 103.

The camera body 200 includes the image sensor 201, an analog-to-digital (A/D) converter 202, an image processor 203, an AF signal processor 204, a format converter 205, a memory such as a dynamic random access memory (hereinafter referred to as DRAM) 206, an image recording unit 207, and a timing generator 208. The camera body 200 further includes a system controller 209, a lens communication unit 210, an object detector 211, an image display memory such as video random access memory (VRAM) 212, and an image display 213. The camera body 200 further includes an operation unit 214, an image capturing mode switch 215, a main switch 216, a switch 217 (hereinafter referred to as SW1), and an image capturing switch 218 (hereinafter referred to as SW2).

The image sensor 201 is a sensor such as a charged coupled device (CCD) sensor and a complementary metal semiconductor device (CMOS) sensor and converts an object image formed via the optical system into an image signal. The A/D converter 202 includes a non-linear amplifier and a correlated double sampling (CDS) circuit that eliminates noise of output from the image sensor 201. The DRAM 206 is a built-in memory such as a random-access memory and is used as a working memory for image compression/decompression and a temporary buffer. The image recording unit 207 includes a recording medium such as a memory card and its interface. The lens communication unit 210 communicates with the lens apparatus 100. The image display 213 displays an image, a display for assisting operation, and a state of the camera system. At a time of image capturing, the image display 213 can display an object area indicating an object and a focus detection point (at least one of a plurality of focus detection points) on the same screen. The operation unit 214 includes a menu switch for setting various settings, such as a setting for an image capturing function of the camera body 200 and a setting for image playback, and a switch for changing a mode to an image capturing mode and a playback mode. The operation unit 214 is used for operating the camera system from an outside of the camera system. The image capturing mode switch 215 is used to select an image capturing mode such as a macro mode and a sport mode. The main switch 216 is used for powering the camera system. SW1 is used for performing image capturing standby operation such as AF and auto exposure (AE). SW2 is used for capturing an image after the operation on SW1.

The system controller 209 controls the entire camera system including performing image analysis on images of objects captured by image sensors. FIG. 1B is a block diagram illustrating the system controller 209. The system controller 209 includes a setting unit 209a, a selection unit 209b, and a focusing unit 209c. In this embodiment, the system controller 209 is included in the camera body 200 but may be configured as a control apparatus separate from the camera body 200. The system controller 209 may include at least one processor and at least one memory coupled to the at least one processor storing instructions that, when executed by the at least one processor, cause the at least one processor to function as the setting unit 209a, the selection unit 209b, and the focusing unit 209c.

A photodiode converts a light beam entering from the lens apparatus 100 to the light-receiving surface of the image sensor 201 into a signal charge based on an entering light amount. The signal charge accumulated in each photodiode is sequentially read as a voltage signal from the image sensor 201 based on a driving pulse given by the timing generator 208 according to an instruction transmitted from the system controller 209.

Each pixel of the image sensor 201 used in this embodiment includes two (a pair of) photodiodes A and B and one microlens provided for the pair of photodiodes A and B. Each pixel divides the entering light beam at the microlens, forms a pair of optical images on the pair of photodiodes A and B, and outputs, from the pair of photodiodes A and B, a pair of pixel signals (A signal and B signal) to be used as an AF signal. An image capturing signal (A+B signal) can be acquired by adding the outputs from the pair of photodiodes A and B.

By combining the plurality of A signals output from the plurality of pixels and combining the plurality of B signals output from the plurality of pixels, a pair of image signals can be acquired as the AF signal (focus detection signal) to be used in autofocus by an image capturing plane phase difference detection method (image capturing plane phase difference AF). The AF signal processor 204 acquires a phase difference (hereinafter referred to as image shift amount) that is an amount of shift between the pair of image signals by performing a correlation calculation on the pair of image signals and acquires focus information including a defocus amount (focusing state), a defocus direction, and reliability of the optical system by using the image shift amount. The reliability is a value that indicates how well the system performs, the consistency of quality in performance, or how reliable or accurate the system is. It may be within any predetermined range. For example, it may be a real number ranging from 0 to 1, an integer from −100 to +100, etc. The AF signal processor 204 acquires a plurality of defocus amounts in a plurality of predetermined areas that can be designated.

Figure 2:
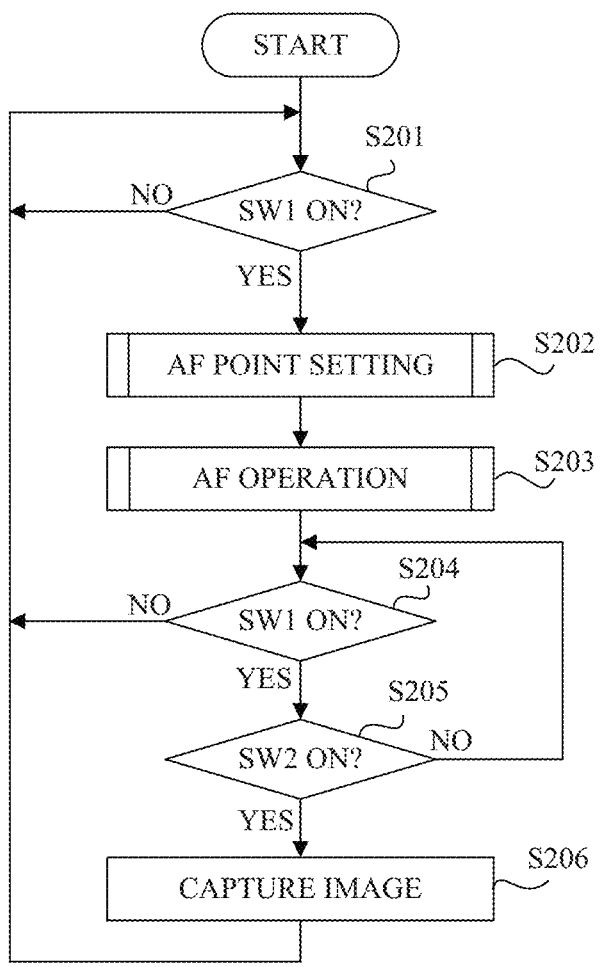
FIG. 2 is a flowchart illustrating a process performed by the camera system during image capturing according to the first embodiment.

FIG. 2 is a flowchart illustrating a process performed by the camera system during image capturing according to this embodiment.

In step S201, the system controller 209 determines whether or not the SW1 is turned on. If the system controller 209 determines that the SW1 is turned on, the process proceeds to step S202, and if the system controller 209 determines that the SW1 is not turned on, the process of this step is repeated.

In step S202 (setting), the system controller 209 (setting unit 209a) performs AF point setting for setting a plurality of AF points (focus detection points).

In step S203, the system controller 209 performs an AF operation.

In step S204, the system controller 209 determines whether or not the SW1 is turned on. If the system controller 209 determines that SW1 is turned on, the process proceeds to step S205, and if the system controller 209 determines that SW1 is not turned on, the process returns to step S201.

In step S205, the system controller 209 determines whether or not the SW2 is turned on. If the system controller 209 determines that SW2 is turned on, the process proceeds to step S206, and if the system controller 209 determines that the SW2 is not turned on, the process returns to step S204.

In step S206, the system controller 209 causes the camera system to perform an image capturing operation.

Figure 3:
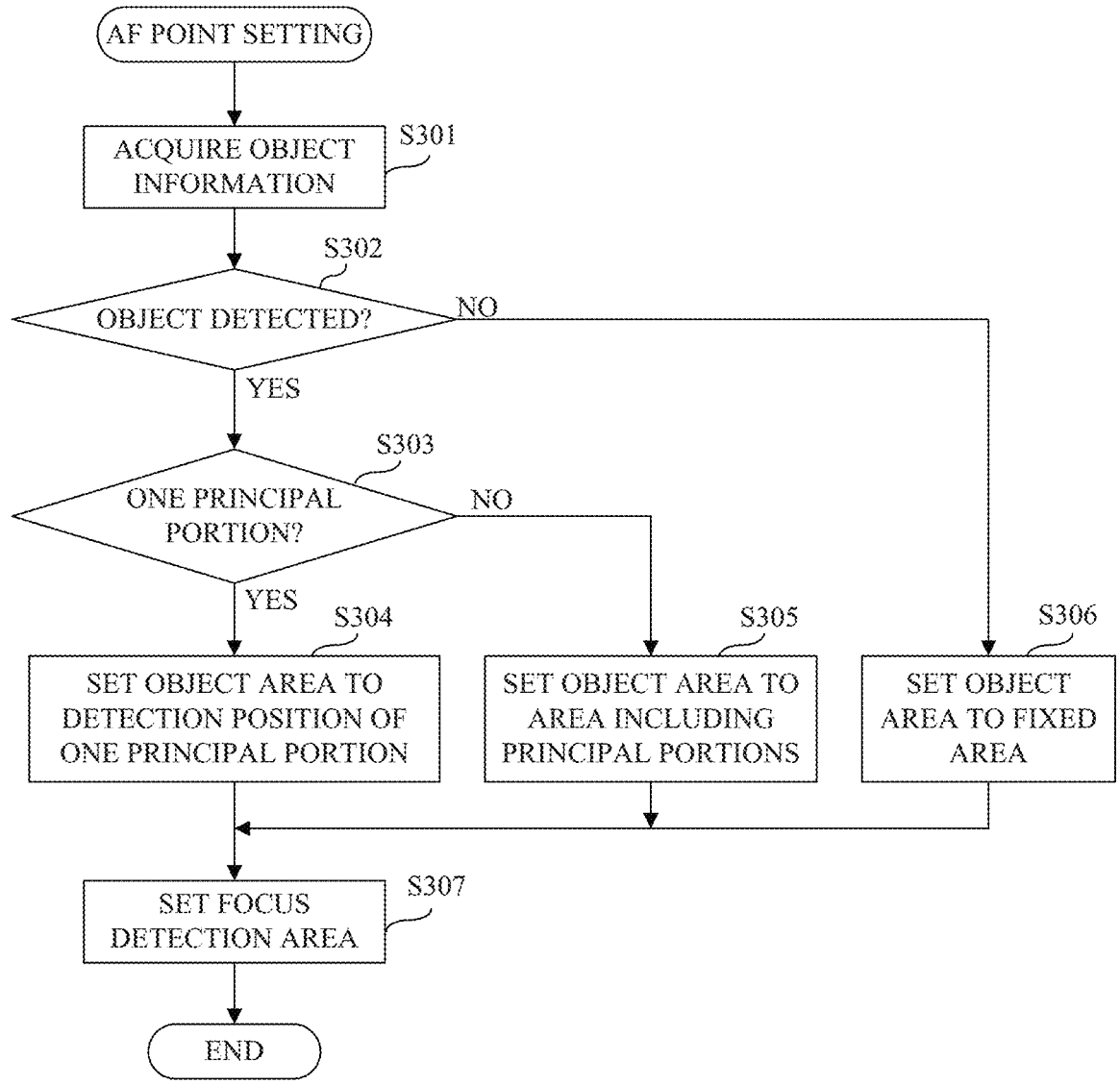
FIG. 3 is a flowchart illustrating AF point setting according to the first embodiment.

FIG. 3 is a flowchart illustrating the AF point setting in step S202 of FIG. 2.

In step S301, the system controller 209 acquires object information from the object detector 211. In this embodiment, the object detector 211 detects an object such as a person, an animal (for example, a dog, a wild bird, or the like), or a vehicle (for example, a two-wheeled vehicle or a four-wheeled vehicle) by using learning by deep learning, image processing, or the like. The object detector 211 also detects a principal portion, a major part, a distinguishing physical feature, or a primary region. The principal portion may refer to a major region or a distinguishing feature on the body of the object such as a pupil, face, and body of a person or an animal and a local point and a vehicle body of a vehicle. The object information is information on an object detected by the object detector 211 and includes a type of the object (a person, an animal, or a vehicle).

In step S302, the system controller 209 determines, by using the object information, whether or not the object detector 211 detects an object. If the system controller 209 determines that the object detector 211 detects the object, the process proceeds to step S303, and if the system controller 209 determines that the object detector 211 does not detect an object, the process proceeds to step S306.

In step S303, the system controller 209 determines, by using the object information, whether or not there is one detected principal portion. If the system controller 209 determines that there is one detected principal portion, the process proceeds to step S304, and if the system controller 209 does not determine that there is one principal portion, that is, if the system controller 209 determines that there are a plurality of detected principal portions, the process proceeds to step S305.

Figure 4A:
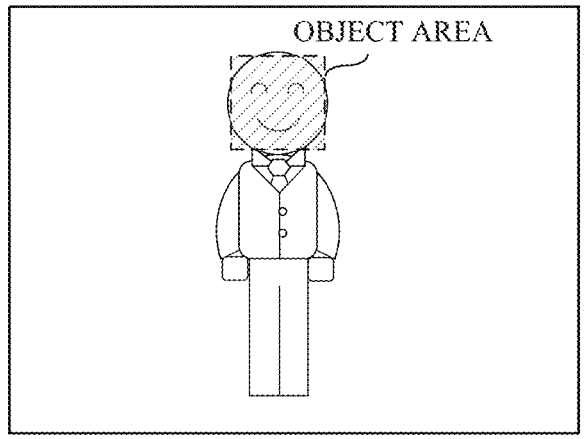
FIGS. 4A and 4B are diagrams each illustrating a relationship between a detected principal portion of a person and an object area, according to the first embodiment.

In step S304, the system controller 209 sets the object area to a detection area of the one detected principal portion. For example, as illustrated in FIG. 4A, in a case where one principal portion (face) is detected, the object area is set to a face detection area (face area) indicated by oblique lines.

Figure 4B:
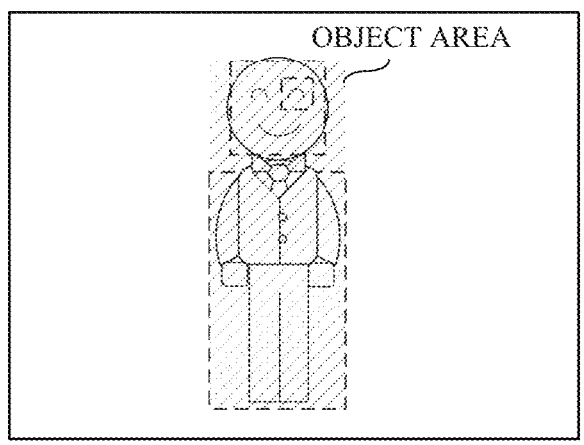
Figure 5A:
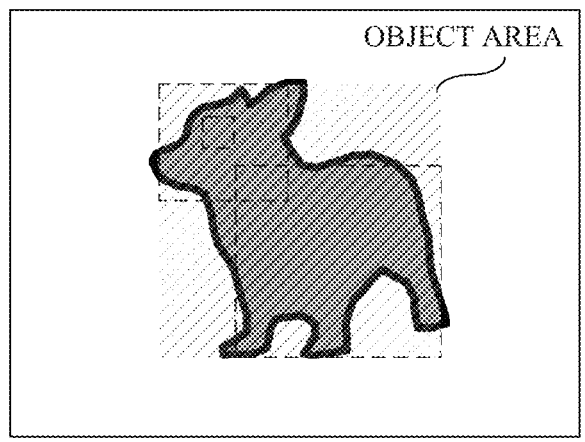
FIGS. 5A to 5C are diagrams each illustrating a relationship between a detected principal portion of an animal or a vehicle and the object area, according to the first embodiment.
Figure 5B:
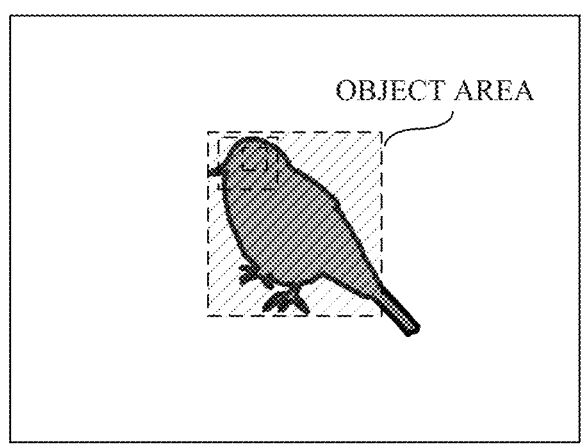
Figure 5C:
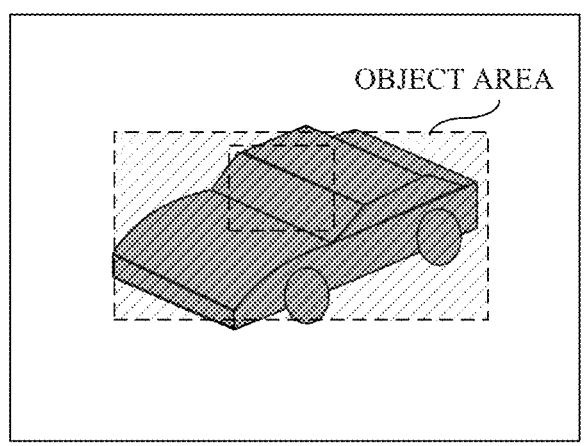
Figure 6A:
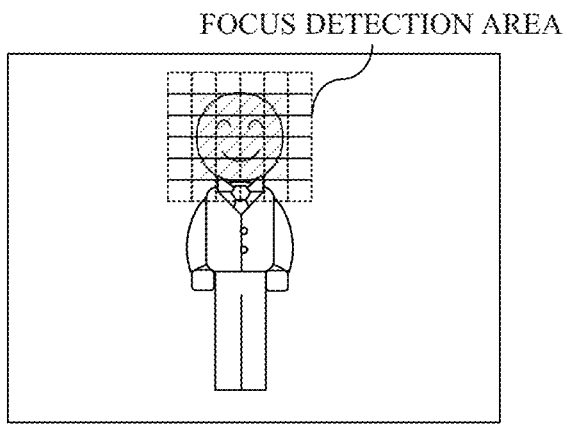
FIGS. 6A to 6E are diagrams each illustrating a relationship between an object area and a focus detection area according to the first embodiment.
Figure 6B:
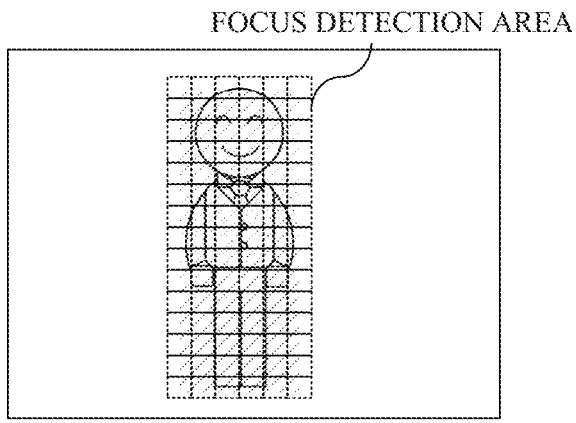
Figure 6C:
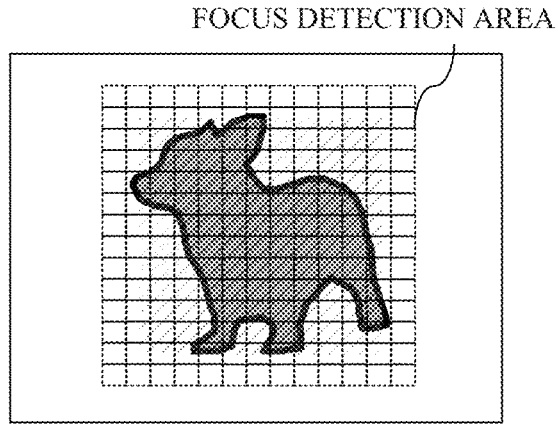
Figure 6D:
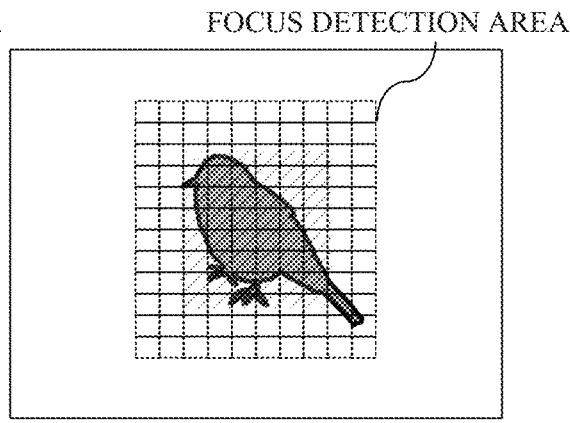
Figure 6E:
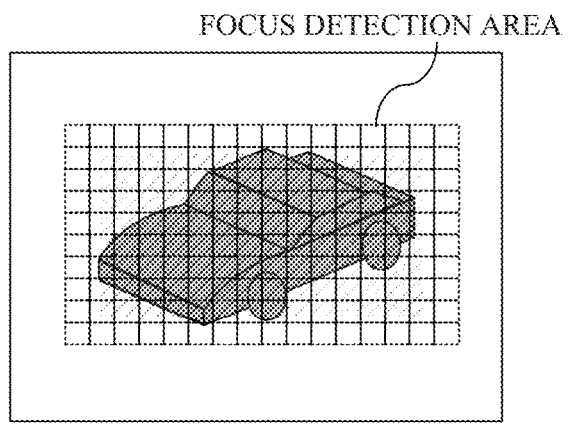

In step S305, the system controller 209 sets the object area to an area including, covering, enclosing, or containing the plurality of detected principal portions. For example, as illustrated in FIG. 4B, in a case where a plurality of principal portions (pupil, face, and body) are detected, the object area is set to an area including the pupil, face, and body indicated by oblique lines. As illustrated in FIGS. 5A to 5C, in a case where the object is an animal or a vehicle and a plurality of principal portions (a pupil, face, or body of the animal or a local point or a vehicle body of the vehicle) are detected, the object area is set to an area including all the principal portions indicated by oblique lines. In this embodiment, the object area is set to the area including all the principal portions, but the object area may be set to an area having a size properly set for actually detected principal portions depending on a type, size, movement, detection accuracy, or the like of the object.

In step S306, the system controller 209 sets the object area to a preset fixed area.

In step S307, the system controller 209 sets a focus detection area, on which focus detection is performed, to the object area set in any of steps S304 to S306. FIGS. 6A to 6E are diagrams each illustrating a relationship between the object area, which is indicated by oblique lines in each of FIGS. 4A to 5C, and the focus detection area set by applying a predetermined gain to the object area. The predetermined gain can be changed as appropriate, and is, for example, increased in a case where it is assumed that the object moves quickly based on an AF operation state or a characteristic of the object. A method of dividing the focus detection area into the AF points may be an arbitrary method, and may be, for example, a method of determining a size of each AF point based on the detected principal portion of the object.

Figure 7A:
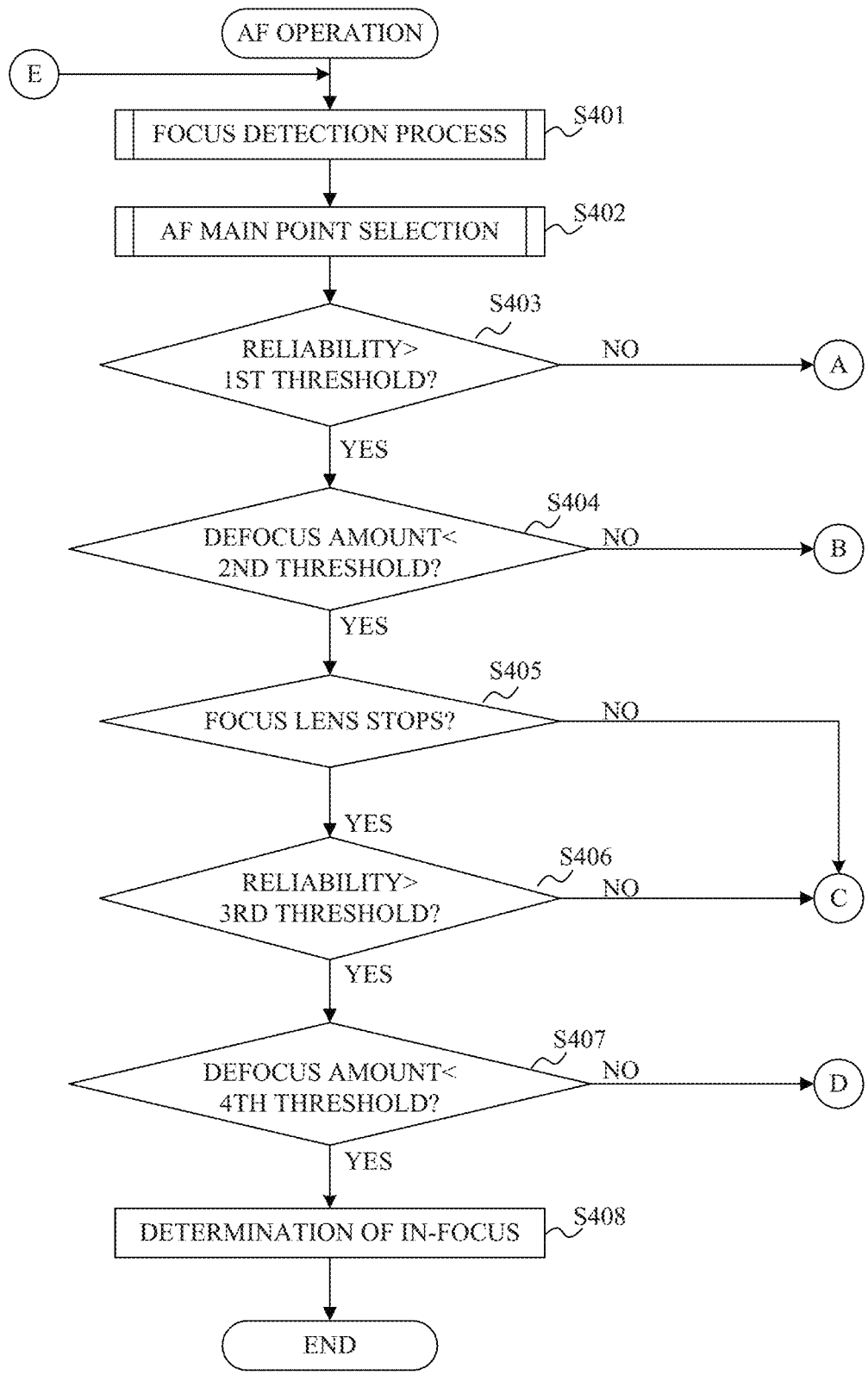
FIGS. 7A and 7B are flowcharts illustrating AF operation according to the first embodiment.
Figure 7B:
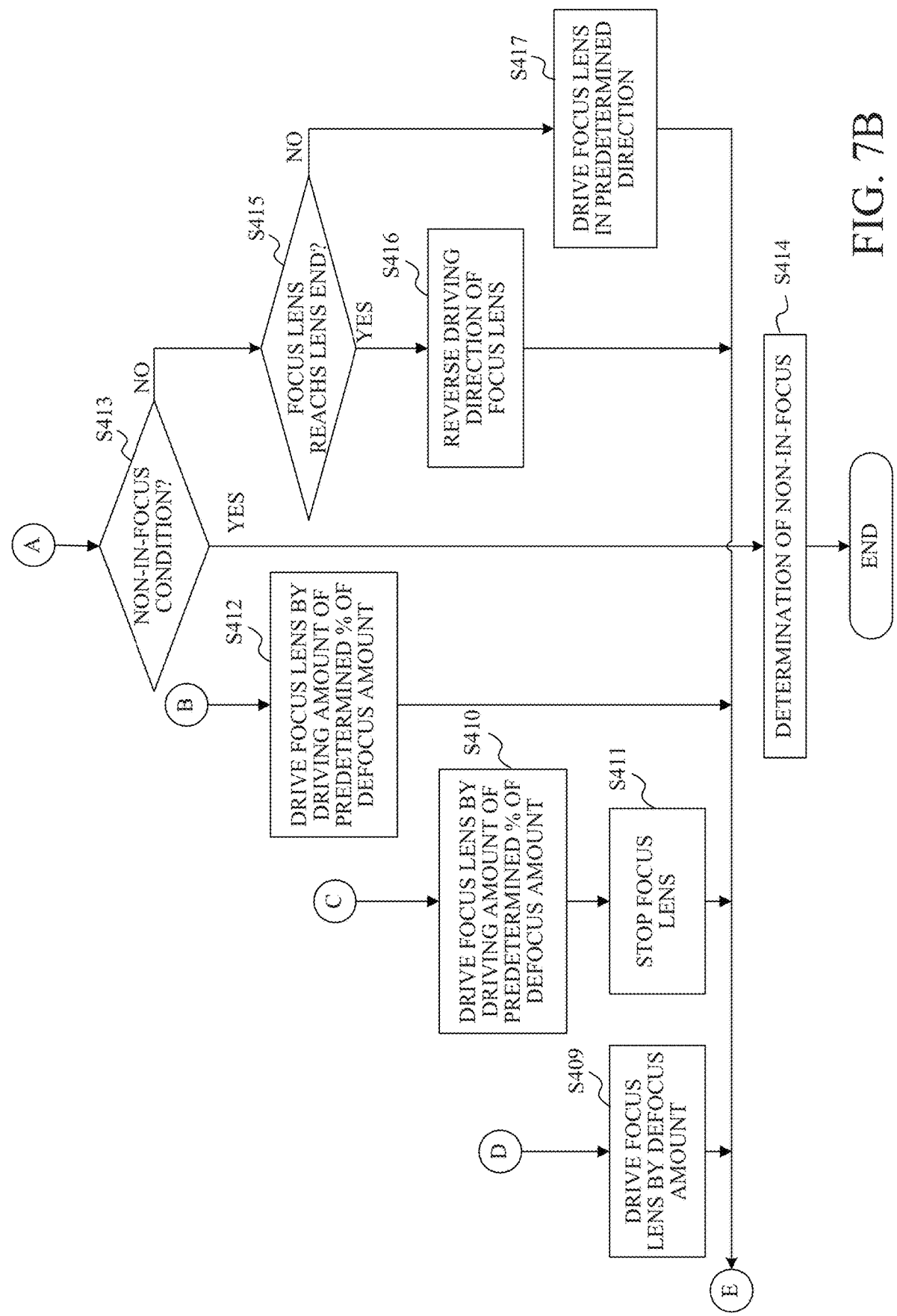

FIG. 7 is a flowchart illustrating the AF operation in step S203 of FIG. 2.

In step S401, the system controller 209 causes the AF signal processor 204 to execute a focus detection process and acquires focus information including a defocus amount and reliability.

In step S402 (selecting), the system controller 209 (selection unit 209b) performs AF main point selection by using the reliability acquired in step S401.

In step S403, the system controller 209 determines whether or not the reliability acquired in step S401 is higher than a preset first threshold. The first threshold is set such that if the reliability is lower than the first threshold, accuracy of the defocus amount cannot be ensured but a focus position direction of the object can be ensured. If the system controller 209 determines that the reliability is higher than the first threshold, the process proceeds to step S404, and if the system controller 209 determines that the reliability is not higher than the first threshold, the process proceeds to step S413. It is possible to arbitrarily set which step to proceed to if the reliability is equal to the first threshold.

In step S404, the system controller 209 determines whether or not the defocus amount acquired in step S401 is smaller than a preset second threshold. The second threshold is a value such that if the defocus amount is smaller than the second threshold, the image sensor 201 can be placed within a focal depth by controlling driving of the focus lens 103 by the defocus amount a predetermined number of times (for example, three times). For example, the second threshold is a value of five times the focal depth. If the system controller 209 determines that the defocus amount is smaller than the second threshold, the process proceeds to step S405, and if the system controller 209 determines that the defocus amount is not smaller than the second threshold, the process proceeds to step S412. It is possible to arbitrarily set which step to proceed to if the defocus amount is equal to the second threshold.

In step S405, the system controller 209 determines whether or not the focus lens 103 stops. If the system controller 209 determines that the focus lens 103 stops, the process proceeds to step S406, and if the system controller 209 determines that the focus lens 103 does not stop, the process proceeds to step S410.

In step S406, the system controller 209 determines whether or not the reliability acquired in step S401 is higher than a preset third threshold. The third threshold is set such that if the reliability is higher than the third threshold, accuracy variation in the defocus amount is within a predetermined range (for example, smaller than the focal depth). If the system controller 209 determines that the reliability is higher than the third threshold, the process proceeds to step S407, and if the system controller 209 determines that the reliability is not higher than the third threshold, the process proceeds to step S410. It is possible to arbitrarily set which step to proceed to if the reliability is equal to the third threshold.

In step S407, the system controller 209 determines whether or not the defocus amount acquired in step S401 is smaller than a preset fourth threshold. The fourth threshold is set such that if the defocus amount is smaller than the fourth threshold, the focus lens 103 is controlled to a position such that the image sensor 201 is within the focal depth. If the system controller 209 determines that the defocus amount is smaller than the fourth threshold, the process proceeds to step S408, and if the system controller 209 determines that the defocus amount is not smaller than the fourth threshold, the process proceeds to step S409. It is possible to arbitrarily set which step to proceed to if the defocus amount is equal to the fourth threshold.

In step S408, the system controller 209 determines that the focus lens 103 is in an in-focus state.

In step S409, the system controller 209 drives, via the lens controller 105, the focus lens 103 by the defocus amount acquired in step S401. By performing the processes in steps S405 to S409, in a case where the reliability acquired in step S401 is higher than the third threshold, the defocus amount can be detected again with the focus lens 103 stopped.

In step S410, the system controller 209 drives, via the lens controller 105, the focus lens 103 by a driving amount that is a predetermined percentage of the defocus amount acquired in step S401.

In step S411, the system controller 209 stops the focus lens 103 via the lens controller 105.

In step S412, the system controller 209 drives, via the lens controller 105, the focus lens 103 by a driving amount that is a predetermined percentage of the defocus amount acquired in step S401. The predetermined percentage is, for example, 80% and is set such that the driving amount of the focus lens 103 is smaller than the defocus amount. A speed of the focus lens 103 is, for example, set to be slower than a speed at which the driving is completed in one frame time. Thereby, it is possible to prevent the object focus position from being exceeded in a case where the defocus amount is incorrect, and it is possible to perform the next driving while the focus lens 103 is driven without being stopped, that is, overlap control can be performed.

In step S413, the system controller 209 determines whether or not a non-in-focus condition is satisfied, the non-in-focus condition being a condition for determining that the object to be focused on does not exist. The non-in-focus condition is set to a condition in which, for example, the driving of the focus lens 103 in an entire movable range has been completed, that is, the focus lens 103 detects both far and close lens ends and returns to an initial position. If the system controller 209 determines that the non-in-focus condition is satisfied, the process proceeds to step S414, and if the system controller 209 determines that the non-in-focus condition is not satisfied, the process proceeds to step S415.

In step S414, the system controller 209 determines that the focus lens is in a non-in-focus state.

In step S415, the system controller 209 determines whether or not the focus lens 103 has reached the far or close lens end. If the system controller 209 determines that the focus lens 103 has reached the lens end, the process proceeds to step S416, and if the system controller 209 determines that the focus lens 103 has not reached the lens end, the process proceeds to step S417.

In step S416, the system controller 209 reverses the driving direction of the focus lens 103 via the lens controller 105.

In step S417, the system controller 209 drives the focus lens 103 in a predetermined direction via the lens controller 105. The speed of the focus lens 103 is set to, for example, the fastest speed in a range of speeds such that the focus position is not passed at a time when the defocus amount becomes detectable.

Figure 8:
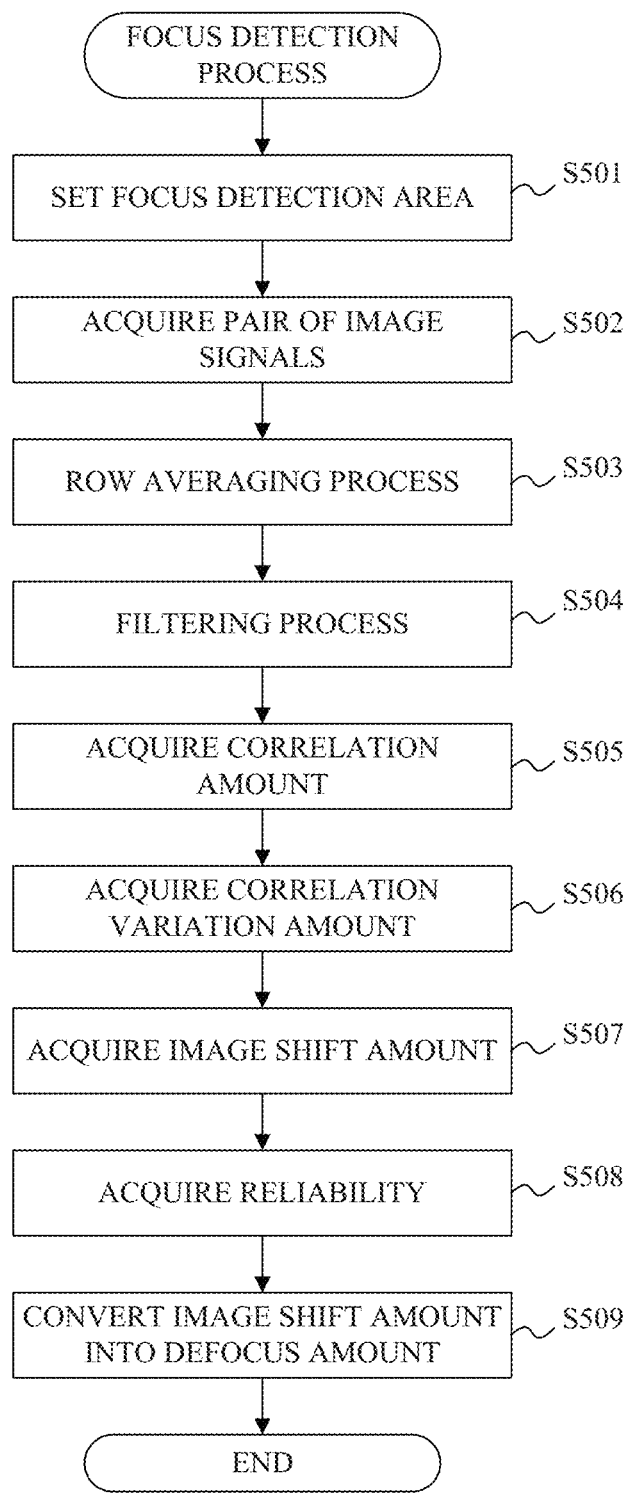
FIG. 8 is a flowchart illustrating a focus detection process according to the first embodiment.

FIG. 8 is a flowchart illustrating the focus detection process in step S401 of FIG. 7.

In step S501, the system controller 209 sets the focus detection area in an arbitrary range of the image sensor 201.

In step S502, the AF signal processor 204 acquires a pair of image signals in the focus detection area set in step S501, the pair of image signals being output from the image sensor 201.

In step S503, the AF signal processor 204 performs a row averaging process in a vertical direction on the pair of image signals acquired in step S502 so as to reduce an effect of noise included in the pair of image signals.

In step S504, the AF signal processor 204 performs a filtering process for extracting a signal component in a predetermined frequency band from the signal on which the row averaging process in the vertical direction has been performed in step S503.

In step S505, the AF signal processor 204 acquires a correlation amount by using the signal on which the filtering process has been performed in step S504.

In step S506, the AF signal processor 204 acquires a correlation variation amount by using the correlation amount acquired in step S505.

In step S507, the AF signal processor 204 acquires an image shift amount by using the correlation variation amount acquired in step S506.

In step S508, the AF signal processor 204 acquires reliability indicating how reliable the image shift amount acquired in step S507 is.

In step S509, the AF signal processor 204 converts the image shift amount into a defocus amount.

Figure 9A:
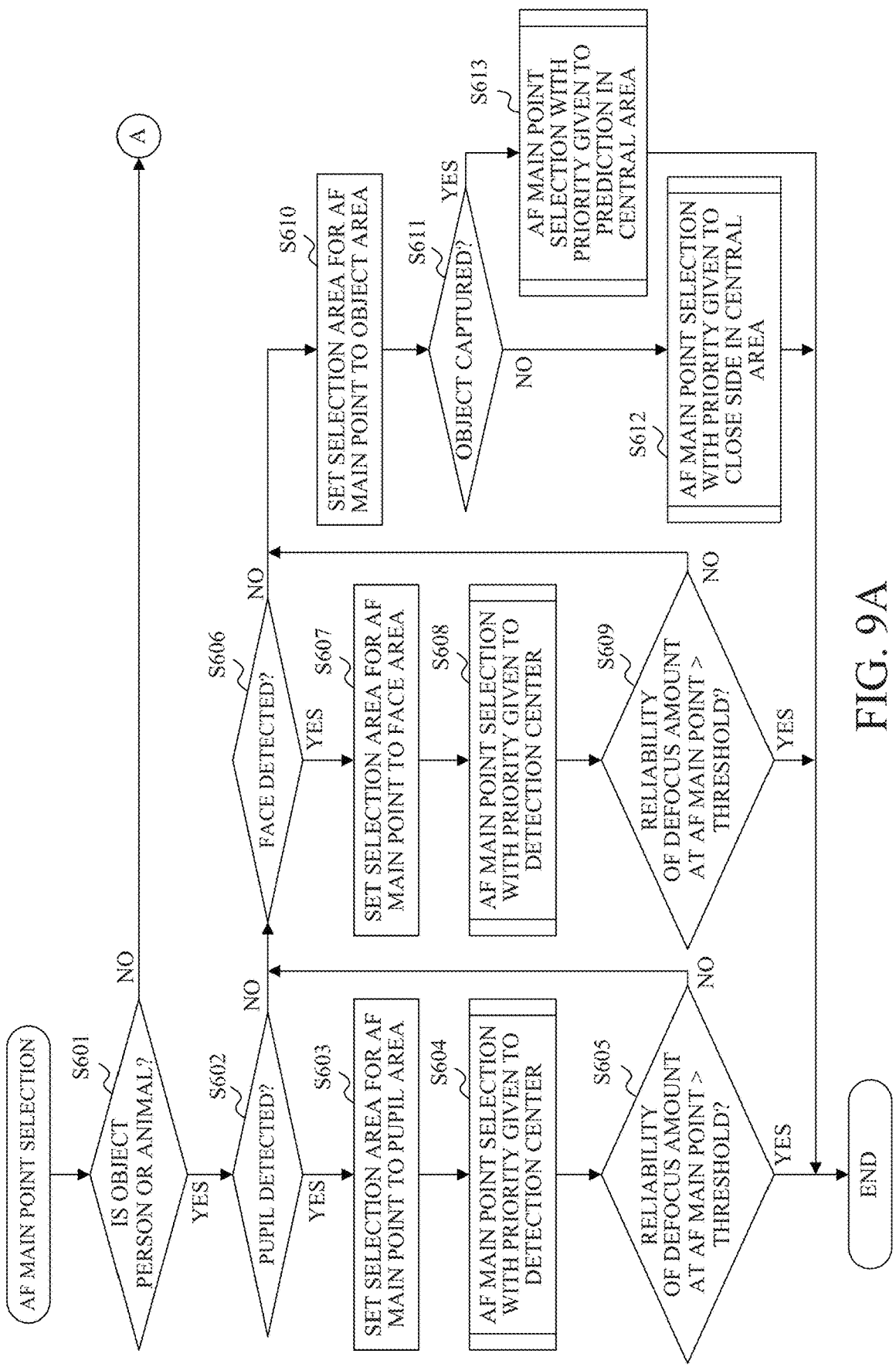
FIGS. 9A and 9B are flowcharts illustrating AF main point selection according to the first embodiment.
Figure 9B:
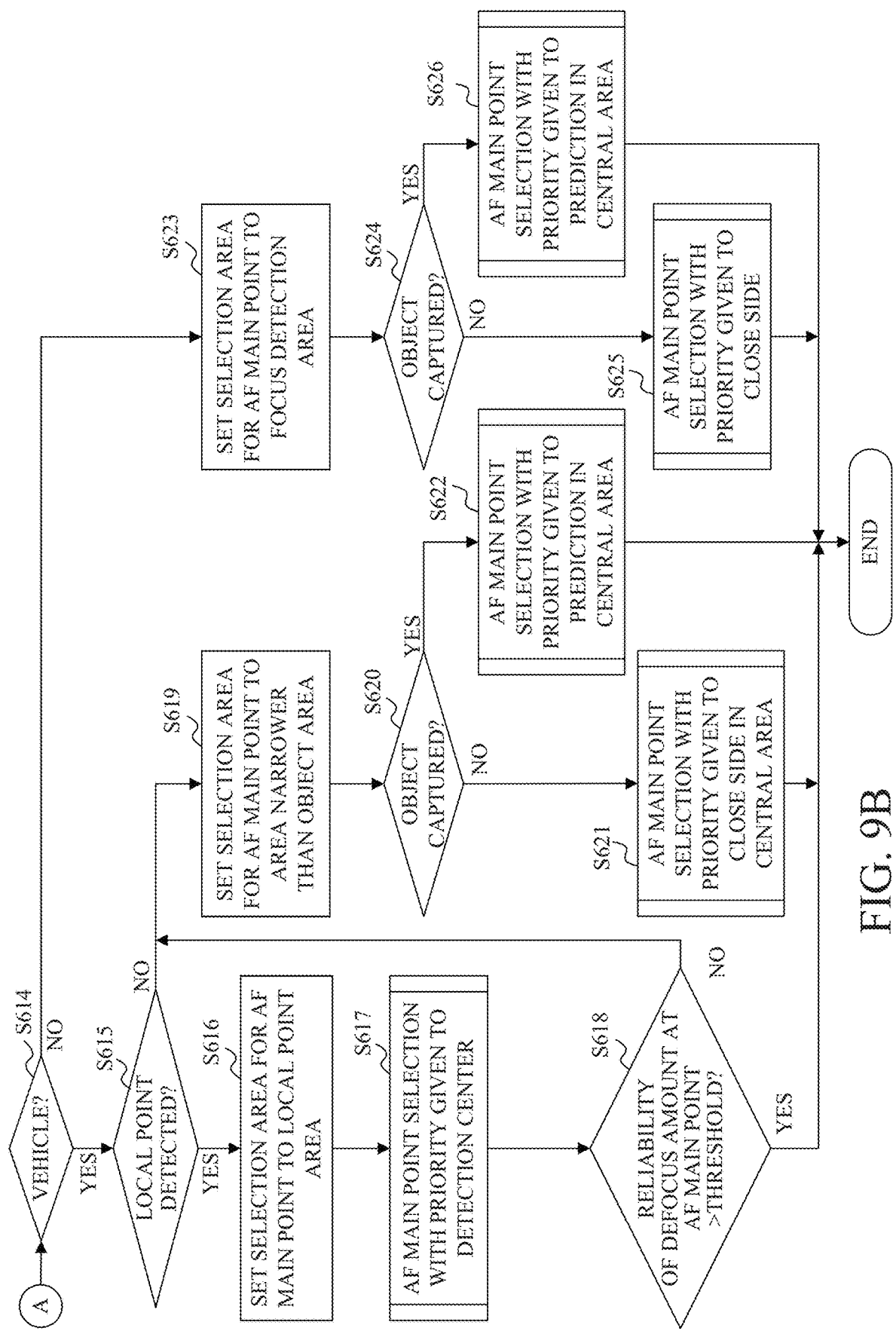

FIGS. 9A and 9B are flowcharts illustrating the AF main point selection in step S402 of FIG. 7 according to this embodiment. In this flow, the AF main point (main focus detection point) is selected from a detection area of a high-priority part. In this embodiment, the priorities are set so that the pupil, face, and body are prioritized in this order, but different priorities may be set as needed.

In step S601, the system controller 209 determines whether or not the object detected by the object detector 211 is a person or an animal. The technique to detect if the object is a person or an animal may be based on any suitable image analysis pattern recognition techniques such as shape analysis, segmentation, etc. For example, the shape analysis may provide descriptors on the relative size of parts of the body (e.g., height, length, head, body, arms, legs). If it is determined that the object is a person or an animal, the process proceeds to step S602, and if it is determined that the object is not a person or an animal, the process proceeds to step S614.

In step S602, the system controller 209 determines whether or not the object detector 211 detects the pupil of the object. The pupil detection may be based on any suitable pupil detection techniques such as ellipse detection, shape matching. If it is determined that the object detector 211 detects the pupil of the object, the process proceeds to step S603, and if it is determined that the object detector 211 does not detect the pupil, the process proceeds to step S606.

In step S603, the system controller 209 sets the selection area (search area) for the AF main point to a pupil area (pupil detection area).

In step S604, the system controller 209 executes AF main point selection with a priority given to a detection center.

In step S605, the system controller 209 determines whether or not the reliability of the defocus amount at the AF main point selected in the pupil area is higher than a threshold, that is, whether the defocus amount at the AF main point selected in the pupil area is within a predetermined variation. The threshold may be set to, for example, the third threshold. If it is determined that the reliability is higher than the threshold, this flow is ended, and if it is determined that the reliability is not higher than the threshold, that is, if it is determined that it is difficult to select the AF main point in the pupil area, the process proceeds to step S606. It is possible to arbitrarily set which step to proceed to if the reliability is equal to the threshold.

In step S606, the system controller 209 determines whether the object detector 211 detects the face of the object. If it is determined that the object detector 211 detects the face of the object, the process proceeds to step S607, and if it is determined that the object detector 211 does not detect the face, the process proceeds to step S610.

In step S607, the system controller 209 sets the selection area for the AF main point to the face area.

In step S608, the system controller 209 executes the AF main point selection with a priority given to the detection center.

In step S609, the system controller 209 determines whether or not the reliability of the defocus amount at the AF main point selected in the face area is higher than a threshold, that is, whether or not the defocus amount at the AF main point selected in the face area is within a predetermined variation. The threshold may be set to, for example, the third threshold. If it is determined that the reliability is higher than the threshold, this flow is ended, and if it is determined that the reliability is not higher than the threshold, that is, if it is determined that it is difficult to select the AF main point in the face area, the process proceeds to step S610. It is possible to arbitrarily set which step to proceed to if the reliability is equal to the threshold.

In step S610, the system controller 209 sets the selection area for the AF main point to the object area set in any of steps S304 to S306 of FIG. 3.

In step S611, the system controller 209 determines whether or not the object has been focused on once (whether or not the object has been captured). If it is determined that the object has been captured, the process proceeds to step S612, and if it is determined that the object has not been captured, the process proceeds to step S613.

In step S612, the system controller 209 executes AF main point selection with a priority given to a close side in a central area, the AF main point selection prioritizing an AF point in which the object is not missed and that is located in the central area where the object is likely to exist.

In step S613, the system controller 209 executes AF main point selection with a priority given to prediction in the central area, the AF main point selection predicting an object position in a target frame by using history information on object positions in a plurality of previous frames and prioritizing an AF point indicated to be close to the object position.

In step S614, the system controller 209 determines whether or not the object detected by the object detector 211 is a vehicle. If it is determined that the object is a vehicle, the process proceeds to step S615, and if it is determined that the object is not a vehicle, the process proceeds to step S623.

In step S615, the system controller 209 determines whether or not the object detector 211 detects a local point of the object. If it is determined that the object detector 211 detects the local point of the object, the process proceeds to step S616, and if it is determined that the object detector 211 does not detect the local point, the process proceeds to step S619.

In step S616, the system controller 209 sets the selection area for the AF main point to a local point area (detection area of the local point).

In step S617, the system controller 209 executes the AF main point selection with a priority given to the detection center.

In step S618, the system controller 209 determines whether or not the reliability of the defocus amount at the AF main point selected in the local point area is higher than a threshold, that is, the defocus amount at the AF main point selected in the local point area is within a predetermined variation. The threshold may be set to, for example, the third threshold. If it is determined that the reliability is higher than the threshold, this flow is ended, and if it is determined that the reliability is not higher than the threshold, that is, if it is determined that it is difficult to select the AF main point in the local point area, the process proceeds to step S619. It is possible to arbitrarily set which step to proceed to if the reliability is equal to the threshold.

In step S619, the system controller 209 sets the selection area for the AF main point to an area narrower than the object area set in any of steps S304 to S306 of FIG. 3, which makes it possible to avoid a problem of focusing on an unintended object in a case where an object, such as a vehicle including a two-wheeled vehicle and a four-wheeled vehicle, moves quickly and is likely to be close to another object such as the ground. In a case where a size of the object is larger than a predetermined size or in a case where the object distance is shorter than a predicted distance, the selection area may be made narrower than the object area.

In step S620, the system controller 209 determines whether or not the object has been focused on once (whether or not the object has been captured). If it is determined that the object has been captured, the process proceeds to step S621, and if it is determined that the object has not been captured, the process proceeds to step S622.

In step S621, the system controller 209 executes the AF main point selection with a priority given to the close side in the central area.

In step S622, the system controller 209 executes the AF main point selection with a priority given to prediction in the central area.

In step S623, the system controller 209 sets the selection area for the AF main point to the focus detection area set in step S307.

In step S624, the system controller 209 determines whether or not the object has been focused on once (whether or not the object has been captured). If it is determined that the object has been captured, the process proceeds to step S625, and if it is determined that the object has not been captured, the process proceeds to step S626.

In step S625, the system controller 209 executes AF main point selection with a priority given to a close side, the AF main point selection selecting, for example, an AF point in which focus detection is performed on a closest object.

In step S626, the system controller 209 executes the AF main point selection with a priority given to prediction in the central area.

Figure 10:
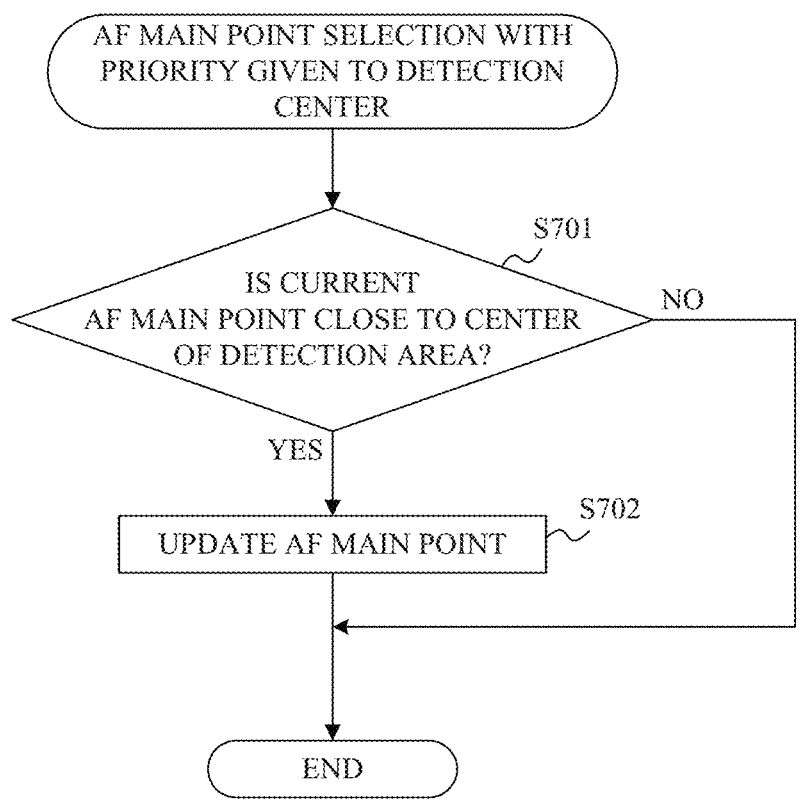
FIG. 10 is a flowchart illustrating AF main point selection with a priority given to a detection center according to the first embodiment.

FIG. 10 is a flowchart illustrating the AF main point selection with a priority given to the detection center according to this embodiment. The flow of FIG. 10 is applied to all AF points in the selection area for the AF main point.

In step S701, the system controller 209 determines whether or not a current AF main point is close to the center of the detection area. If it is determined that the current AF main point is close to the center of the detection area, the process proceeds to step S702, and if it is determined that the current AF main point is not close to the center of the detection area, this flow is ended.

In step S702, the system controller 209 updates the AF main point.

Figure 11:
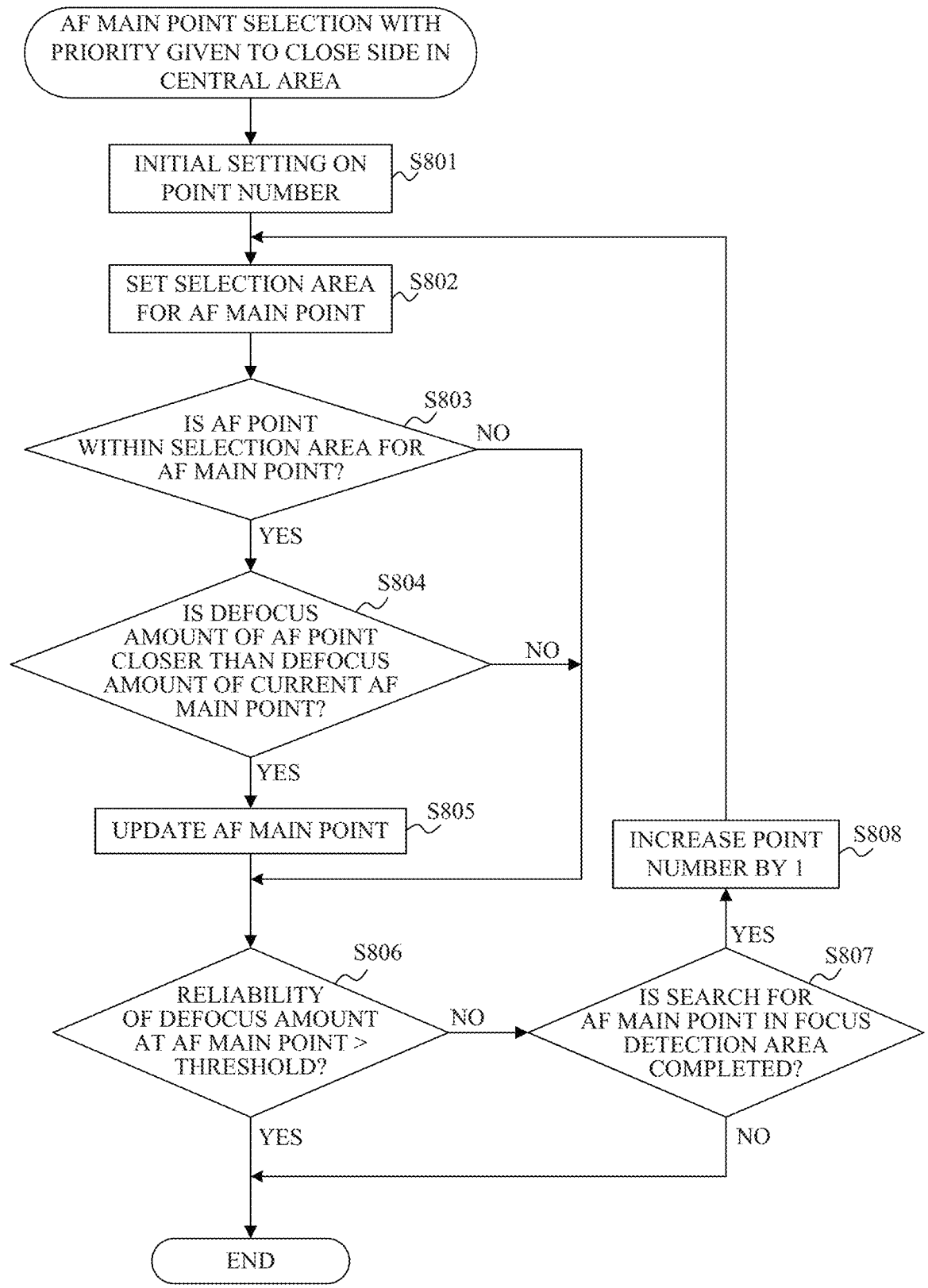
FIG. 11 is a flowchart illustrating AF main point selection with a priority given to a close side in a central area according to the first embodiment.

FIG. 11 is a flowchart illustrating the AF main point selection with a priority given to the close side in the central area according to this embodiment.

In step S801, the system controller 209 performs initial setting on a point number N. In this embodiment, the point number N is set to 3.

In step S802, the system controller 209 sets the selection area for the AF main point to an area including the point number N×the point number N at the center of the detection area.

In step S803, the system controller 209 determines whether or not an AF point is within the selection area for the AF main point. If it is determined that the AF point is within the selection area, the process proceeds to step S804, and if it is determined that the AF point is not within the selection area, the process proceeds to step S806.

In step S804, the system controller 209 determines whether or not a defocus amount of the AF point is closer than the defocus amount of the current AF main point. If it is determined that the defocus amount of the AF point is closer, the process proceeds to step S805, and if it is determined that the defocus amount of the AF point is not closer, the process proceeds to step S806.

In step S805, the system controller 209 updates the AF main point.

The processes from step S803 to step S805 are executed for each AF point in the focus detection area.

In step S806, the system controller 209 determines whether or not the reliability of the defocus amount at the AF main point is higher than a threshold. If it is determined that the reliability is higher than the threshold, this flow is ended, and if it is determined that the reliability is not higher than the threshold, the process proceeds to step S807. It is possible to arbitrarily set which step to proceed to if the reliability is equal to the first threshold.

In step S807, the system controller 209 determines whether or not a search for the AF main point in the focus detection area has been completed. If it is determined that the search has been completed, this flow is ended, and if it is determined that the search has not been completed, the process proceeds to step S808.

In step S808, the system controller 209 increases the point number N by one.

Figure 12:
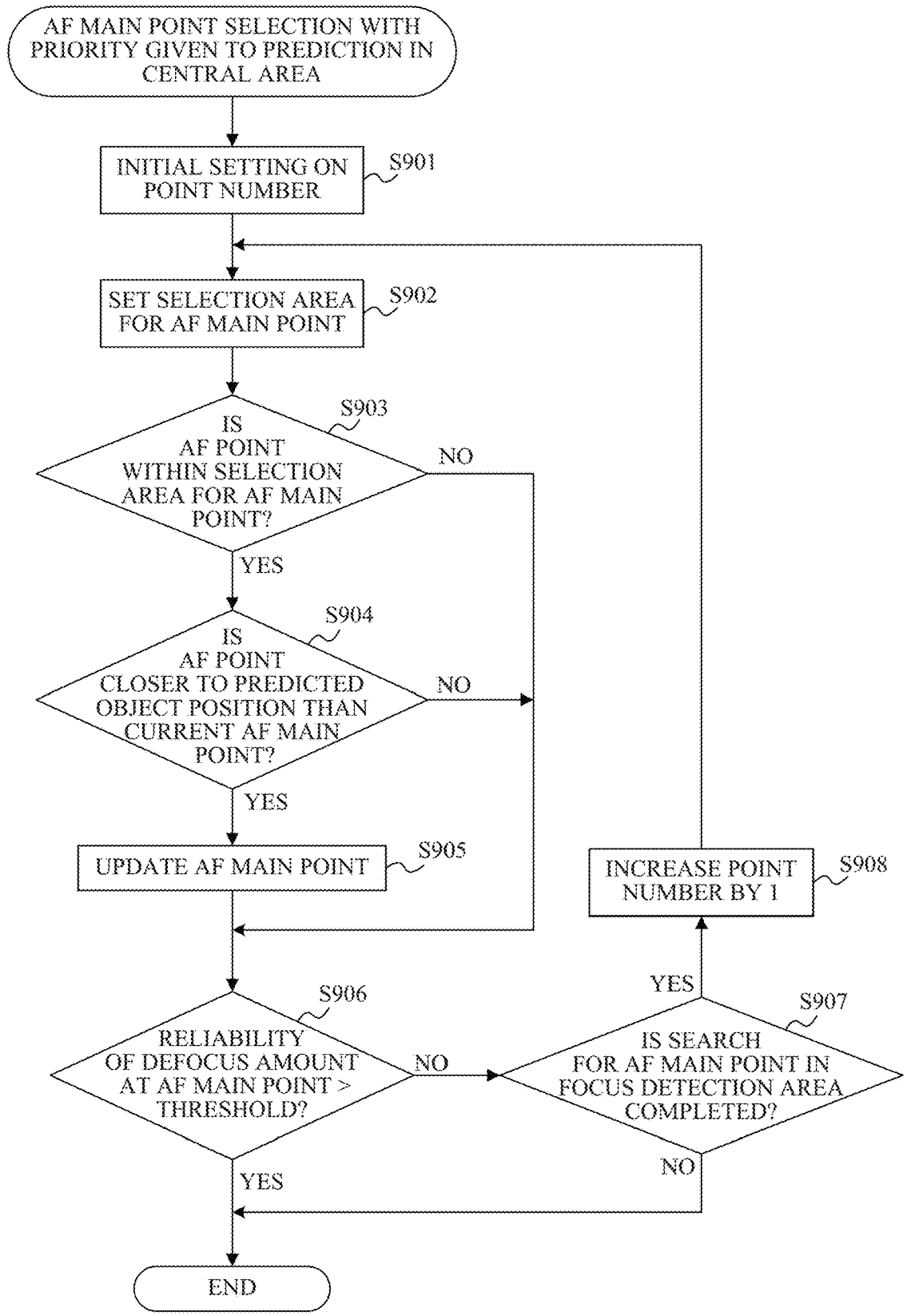
FIG. 12 is a flowchart illustrating AF main point selection with a priority given to a prediction in a central area according to the first embodiment.

FIG. 12 is a flowchart illustrating the AF main point selection with a priority given to prediction in the central area according to this embodiment.

In step S901, the system controller 209 performs the initial setting on the point number N. In this embodiment, the point number N is set to 3.

In step S902, the system controller 209 sets the selection area for the AF main point to the body area (body detection area).

In step S903, the system controller 209 determines whether an AF point is within the selection area for the AF main point. If it is determined that the AF point is within the selection area, the process proceeds to step S904, and if it is determined that the AF point is not within the selection area, the process proceeds to step S906.

In step S904, the system controller 209 determines whether or not the AF point is closer to a predicted object position than the current AF main point, the predicted object position being acquired from the defocus amount and the current position of the focus lens 103. If it is determined that the AF point is closer, the process proceeds to step S905, and if it is determined that the AF point is not closer, the process proceeds to step S906.

In step S905, the system controller 209 updates the AF main point.

The processes from step S903 to step S905 are executed for each AF point in the focus detection area.

In step S906, the system controller 209 determines whether or not the reliability of the defocus amount at the AF main point is higher than a threshold. If it is determined that the reliability is higher than the threshold, this flow is ended, and if it is determined that the reliability is not higher than the threshold, the process proceeds to step S907. It is possible to arbitrarily set which step to proceed to if the reliability is equal to the first threshold.

In step S907, the system controller 209 determines whether or not a search for the AF main point in the focus detection area has been completed. If it is determined that the search has been completed, this flow is ended, and if it is determined that the search has not been completed, the process proceeds to step S908.

In step S908, the system controller 209 increases the point number N by 1.

As described above, according to the configuration of this embodiment, in a case where a plurality of principal portions of an object are detected, it is possible to accurately perform focusing on a higher priority area while an area where the focus detection is difficult is avoided. In particular, in a case where an object, such as a vehicle including a two-wheeled vehicle and a four-wheeled vehicle, moves quickly and is likely to be close to another object such as the ground, it is possible to realize optimum focusing.

Second Embodiment

In this embodiment, different points from the first embodiment are described. A configuration of a camera system according to this embodiment is similar to the configuration of the camera system according to the first embodiment.

In the first embodiment, in a case where the selection area for the AF main point is set to the detection area of a portion having a relatively small size in an object, such as a pupil and face of a person or an animal and a local point of a vehicle, the AF main point selection is performed that prioritizes the detection center while it is assumed that the detected position does not shift substantially. However, in a case where it is necessary to consider the shift of the detected position, a process may be performed such that an AF point having higher reliability of the defocus amount is selected as the AF main point.

In the first embodiment, in a case where the reliability of the AF main point is low, the AF main point being selected in the detection area of the pupil or face of the person or animal or the local point of the vehicle, AF main point selection is performed that prioritizes an AF point in which the object is not missed and that is located in the central area where the object is likely to exist in consideration of complexity of an object shape. However, in a case where it is not necessary to consider the complexity of the object shape, the process may be performed such that an AF point having higher reliability of the defocus amount is selected as the AF main point.

Figure 13A:
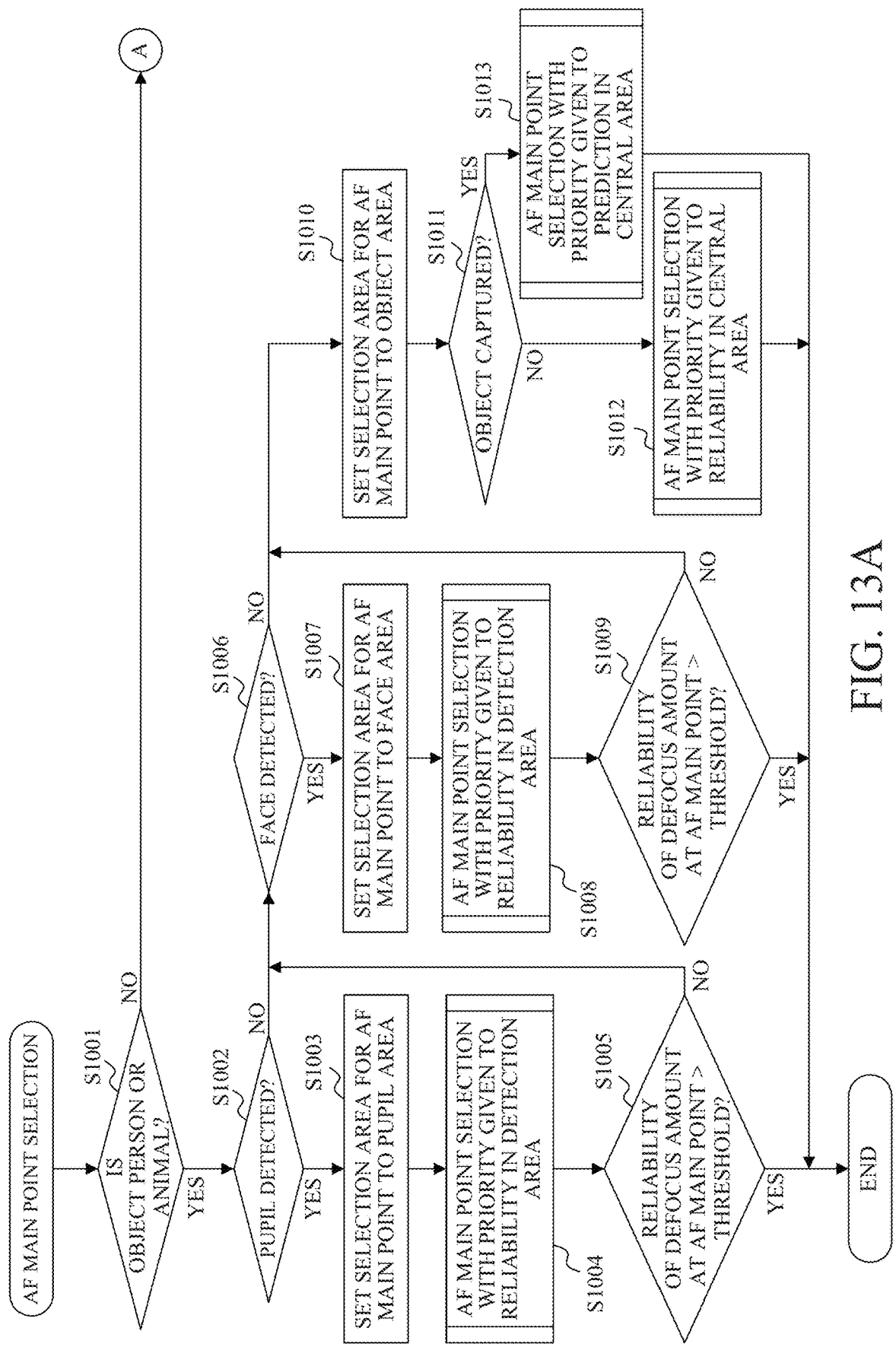
FIGS. 13A and 13B are flowcharts illustrating AF main point selection according to a second embodiment.
Figure 13B:
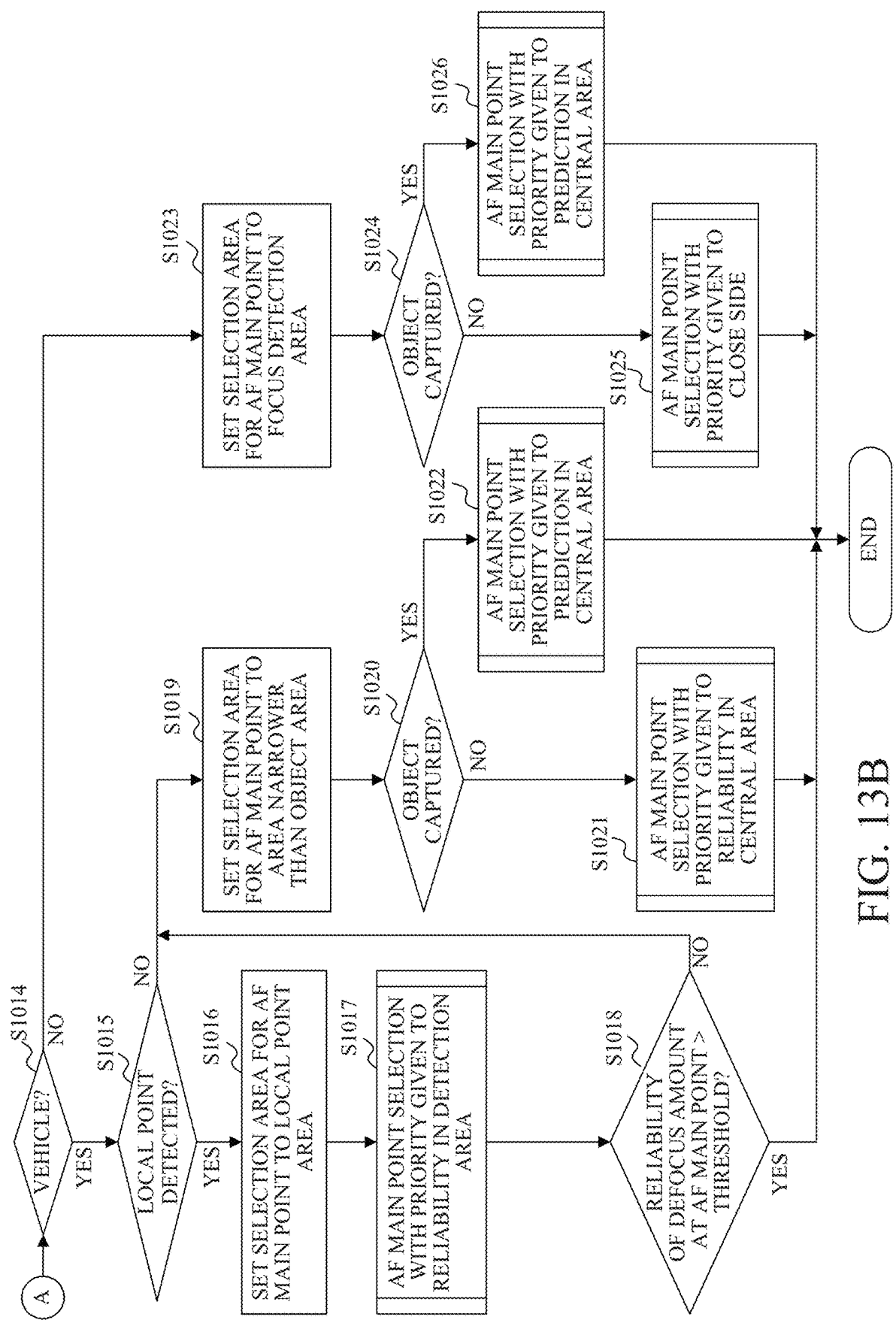

FIGS. 13A and 13B are flowcharts illustrating AF main point selection in step S402 of FIG. 7A according to this embodiment. The processes of steps S1001 to S1003 are similar to the processes of steps S601 to S603 of FIG. 9A, respectively, and thus a detailed description thereof will be omitted. The processes of steps S1005 to S1007 are similar to the processes of steps S605 to S607 of FIG. 9A, respectively, and thus a detailed description thereof will be omitted. The processes of steps S1009 to S1011 are similar to the processes of steps S609 to S611 of FIG. 9A, respectively, and thus a detailed description thereof will be omitted. The processes of steps S1013 to S1016 are similar to the processes of steps S613 to S616 of FIGS. 9A and 9B, respectively, and thus a detailed description thereof will be omitted. The processes of steps S1018 to S1020 are similar to the processes of steps S618 to S620 of FIG. 9B, respectively, and thus a detailed description thereof will be omitted. The processes of steps S1022 to S1026 are similar to the processes of steps S622 to S626 of FIG. 9B, respectively, and thus a detailed description thereof will be omitted.

In each of step S1004, step S1008, and step S1017, the system controller 209 executes AF main point selection with a priority given to reliability in the detection area.

In each of step S1012 and step S1021, the system controller 209 executes AF main point selection with a priority given to reliability in the central area, the AF main point selection prioritizing an AF point having high reliability of the defocus amount at the detection area.

Figure 14:
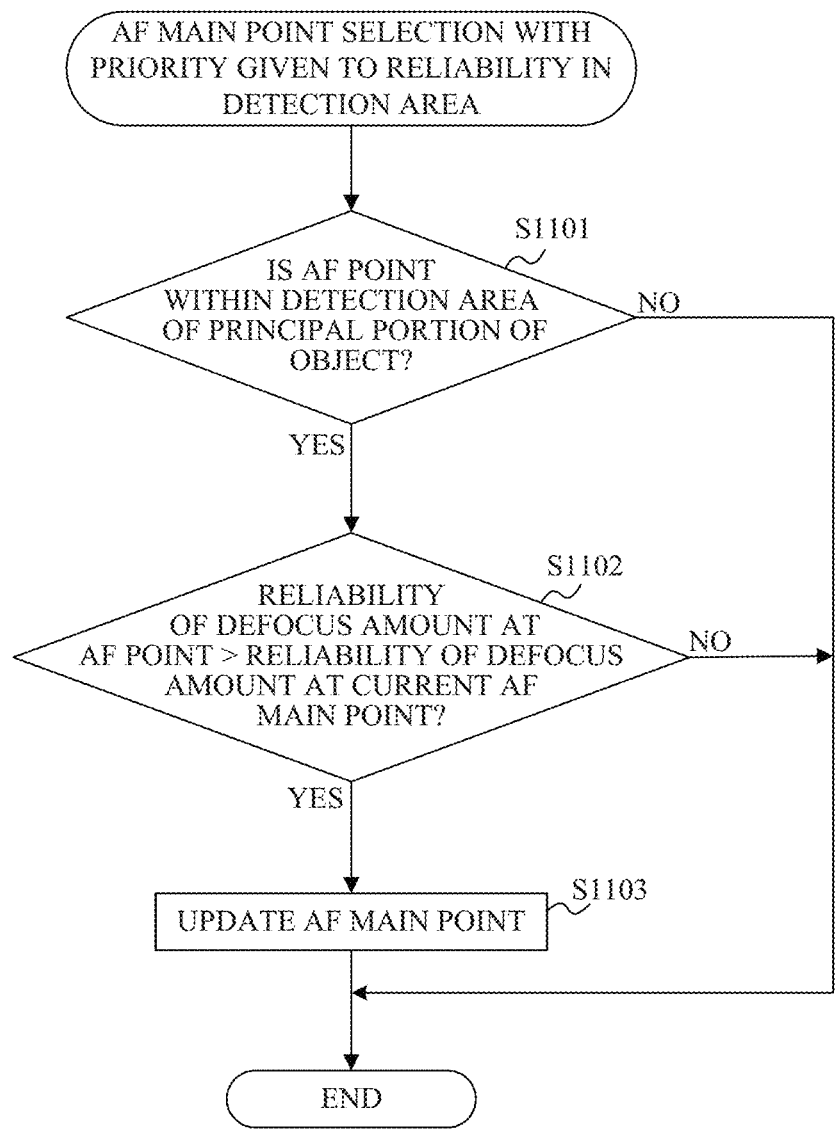
FIG. 14 is a flowchart illustrating AF main point selection with a priority given to reliability in a detection area according to the second embodiment.

FIG. 14 is a flowchart illustrating the AF main point selection with a priority given to the reliability in the detection area according to this embodiment. The flow of FIG. 14 is applied to each AF point in the selection area for the AF main point.

In step S1101, the system controller 209 determines whether or not an AF point is within the detection area of the principal portion of the object. If it is determined that the AF point is within the detection area, the process proceeds to step S1103, and if it is determined that the AF point is not within the detection area, this flow is ended.

In step S1102, the system controller 209 determines whether or not the reliability of the defocus amount at the AF point is higher than the reliability of the defocus amount at the current AF main point. If it is determined that the reliability of the defocus amount at the AF point is higher, the process proceeds to step S1104, and if it is determined that the reliability of the defocus amount at the AF point is not higher, this flow is ended.

In step S1103, the system controller 209 updates the AF main point.

Figure 15:
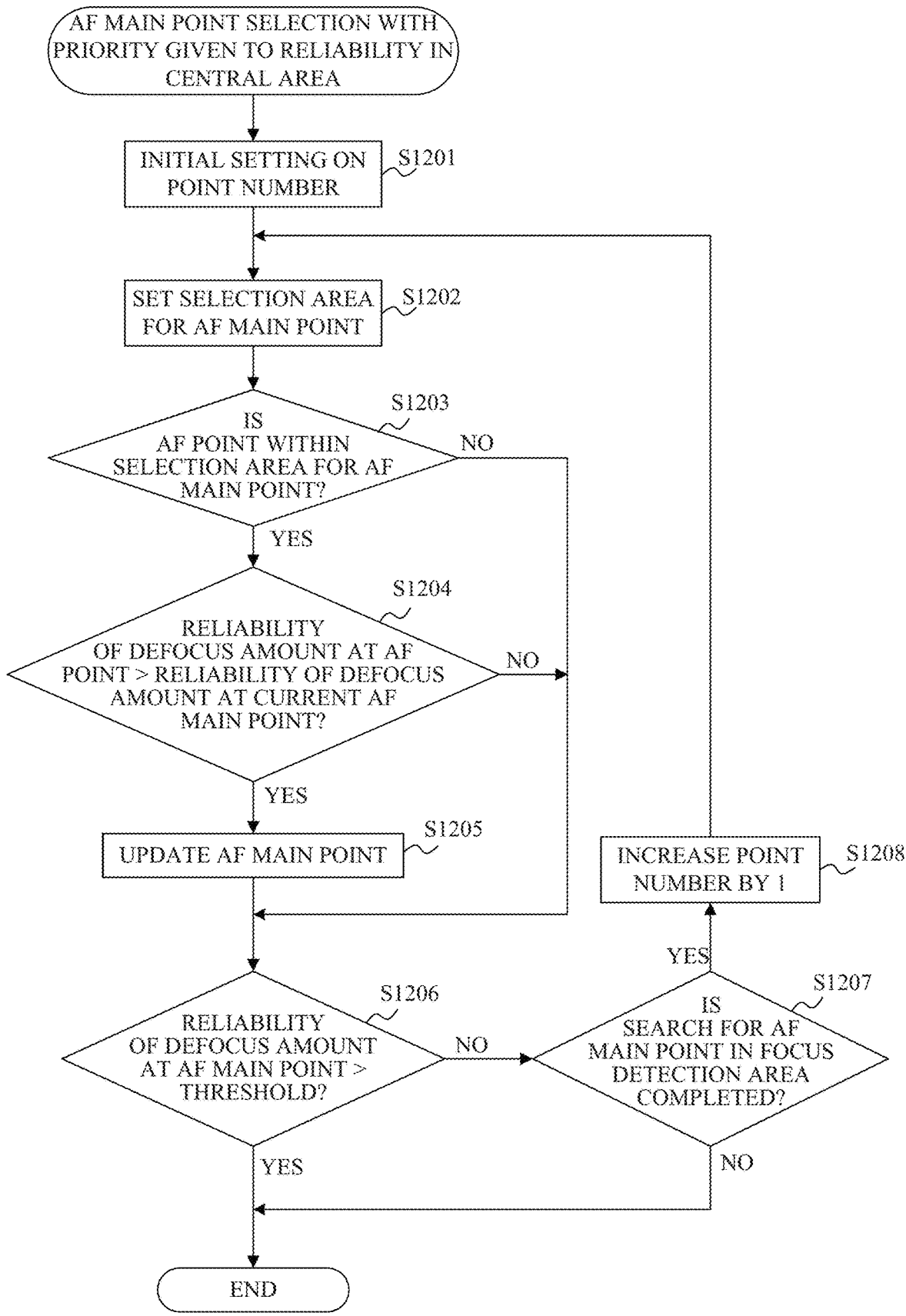
FIG. 15 is a flowchart illustrating AF main point selection with a priority given to reliability in a central area according to the second embodiment.

FIG. 15 is a flowchart illustrating the AF main point selection with a priority given to the reliability in the central area according to this embodiment.

In step S1201, the system controller 209 performs the initial setting on the point number N. In this embodiment, the point number N is set to 3.

In step S1202, the system controller 209 sets the selection area for the AF main point to an area including the point number N×the point number N at the center of the object area.

In step S1203, the system controller 209 determines whether or not an AF point is within the selection area for the AF main point. If it is determined that the AF point is within the selection area, the process proceeds to step S1204, and if it is determined that the AF point is not within the selection area, the process proceeds to step S1206.

In step S1204, the system controller 209 determines whether or not the reliability of the defocus amount at the AF point is higher than the reliability of the defocus amount at the current AF main point. If it is determined that the reliability of the defocus amount at the AF point is higher, the process proceeds to step S1205, and if it is determined that the reliability of the defocus amount at the AF point is not higher, the process proceeds to step S1206.

In step S1205, the system controller 209 updates the AF main point.

The processes of step S1203 to step S1205 are executed for each AF point in the focus detection area.

In step 1206, the system controller 209 determines whether or not the reliability of the defocus amount at the AF main point is higher than a threshold. If it is determined that the reliability is higher than the threshold, this flow is ended, and if it is determined that the reliability is not higher than the threshold, the process proceeds to step S1207. It is possible to arbitrarily set which step to proceed to if the reliability is equal to the first threshold.

In step S1207, the system controller 209 determines whether or not a search for the AF main point in the focus detection area has been completed. If it is determined that the search has been completed, this flow is ended, and if it is determined that the search has not been completed, the process proceeds to step S1208.

In step S1208, the system controller 209 increases the point number N by 1.

As described above, according to the configuration of this embodiment, in a case where a plurality of principal portions of an object are detected, it is possible to accurately perform focusing on a higher priority area while an area where the focus detection is difficult is avoided. In particular, in a case where an object, such as a vehicle including a two-wheeled vehicle and a four-wheeled vehicle, moves quickly and is likely to be close to another object such as the ground, it is possible to realize optimum focusing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide a control apparatus, an image capturing apparatus, a control method, and a memory medium each of which can realize optimum focusing on a vehicle.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-075889, filed on Apr. 28, 2021, which is hereby incorporated by reference herein in its entirety.

What is claimed is:

1. A control apparatus comprising:
at least one processor; and
at least one memory coupled to the at least one processor storing instructions that, when executed by the at least one processor, cause the at least one processor to function as:
  a setting unit configured to set an object area indicating an object by using object information that includes information on a part of the object and is based on an image signal converted from an object image and to set a plurality of focus detection points by using the object area; and
  a selection unit configured to set, from the plurality of focus detection points, a selection area for a main focus detection point on which focusing is performed and to select the main focus detection point from the selection area for the main focus detection point,
wherein in a case where the object is a vehicle, the selection unit makes the selection area narrower than the object area,
wherein the selection unit matches the selection area for the main focus detection point with the object area in a case where the object is a local point of a vehicle, and makes the selection area for the main focus detection point narrower than the object area so that the selection area for the main focus detection portion is included in the object area in a case where the object is an entire vehicle.

2. The control apparatus according to claim 1, wherein the at least one processor further functions as a focusing unit configured to perform focusing by moving a focus lens along an optical axis based on a focusing state of the main focus detection point.

3. The control apparatus according to claim 1, wherein in a case where the object is a local point of a vehicle and reliability of a focusing state of the main focus detection point is high, the selection unit makes the selection area narrower than the object area.

4. The control apparatus according to claim 1, wherein in a case where a size of the object is larger than a predetermined size or in a case where an object distance is shorter than a predetermined distance, the selection unit makes the selection area narrower than the object area.

5. An image capturing apparatus comprising:
an image sensor configured to convert an object image into an image signal; and
a control apparatus,
wherein the control apparatus includes:
  at least one processor; and
  at least one memory coupled to the at least one processor storing instructions that, when executed by the at least one processor, cause the at least one processor to function as:
    a setting unit configured to set an object area indicating an object by using object information that includes information on a part of the object and is based on the image signal converted from the object image and to set a plurality of focus detection points by using the object area; and
    a selection unit configured to set, from the plurality of focus detection points, a selection area for a main focus detection point on which focusing is performed and to select the main focus detection point from the selection area for the main focus detection point,
wherein the selection unit matches the selection area for the main focus detection point with the object area in a case where the object is a local point of a vehicle, and makes the selection area for the main focus detection point narrower than the object area so that the selection area for the main focus detection portion is included in the object area in a case where the object is an entire vehicle.

6. The image capturing apparatus according to claim 5, further comprising a display capable of displaying the object area and at least one of the plurality of focus detection points on a same screen.

7. A control method comprising:
setting an object area indicating an object by using object information that includes information on a part of the object and is based on an image signal converted from an object image and setting a plurality of focus detection points by using the object area;
setting, from the plurality of focus detection points, a selection area for a main focus detection point on which focusing is performed, and
selecting the main focus detection point from the selection area for the main focus detection point,
wherein in a case where the object is a vehicle, the selection area is made narrower than the object area in the selecting,
wherein, in the selecting, in a case where the object is a local point of a vehicle, the selection area for the main focus detection point is matched with the object area and in a case where the object is an entire vehicle, the selection area for the main focus detection point is made narrower than the object area so that the selection area for the main focus detection portion is included in the object area.

8. A non-transitory computer-readable memory medium storing a computer program that causes a computer to execute the control method according to claim 7.

9. A control apparatus comprising:

at least one processor; and at least one memory coupled to the at least one processor storing instructions that, when executed by the at least one processor, cause the at least one processor to function as:

a setting unit configured to set an object area indicating an object by using object information that includes information on a part of the object and is based on an image signal converted from an object image and to set a plurality of focus detection points by using the object area; and a selection unit configured to set, from the plurality of focus detection points, a selection area for a main focus detection point on which focusing is performed and to select the main focus detection point from the selection area for the main focus detection point, wherein in a case where the object is an entire vehicle, the selection unit makes the selection area for the main focus detection point narrower than the object area so that the selection area for the main focus detection portion is included in the object area, and wherein in a case where the object is an entire vehicle, the selection unit increases a ratio of narrowing down the selection area for the main focus detection point compared to when the object is a local part of a vehicle.

10. A control method comprising:

setting an object area indicating an object by using object information that includes information on a part of the object and is based on an image signal converted from an object image and setting a plurality of focus detection points by using the object area, setting, from the plurality of focus detection points, a selection area for a main focus detection point on which focusing is performed, and selecting the main focus detection point from the selection area for the main focus detection point, wherein in a case where the object is an entire vehicle, the selection unit makes the selection area for the main focus detection point narrower than the object area so that the selection area for the main focus detection portion is included in the object area, and wherein in a case where the object is an entire vehicle, the selection unit increases a ratio of narrowing down the selection area for the main focus detection point compared to when the object is a local part of a vehicle.

11. A non-transitory computer-readable memory medium storing a computer program that causes a computer to execute the control method according to claim 10.

* * * * *